(12) United States Patent
Kimura

(10) Patent No.: US 10,124,226 B2
(45) Date of Patent: Nov. 13, 2018

(54) BICYCLE TRAINER

(71) Applicant: GROWTAC, Inc., Kanagawa (JP)

(72) Inventor: Masayuki Kimura, Kanagawa (JP)

(73) Assignee: GROWTAC, Inc., Kanagawa (JP)

( * ) Notice: Subject to any disclaimer, the term of this patent is extended or adjusted under 35 U.S.C. 154(b) by 0 days.

(21) Appl. No.: 15/316,571

(22) PCT Filed: Aug. 24, 2015

(86) PCT No.: PCT/JP2015/073695
§ 371 (c)(1),
(2) Date: Dec. 6, 2016

(87) PCT Pub. No.: WO2016/067720
PCT Pub. Date: May 6, 2016

(65) Prior Publication Data
US 2017/0189778 A1 Jul. 6, 2017

(30) Foreign Application Priority Data
Oct. 28, 2014 (JP) .................................. 2014-219786

(51) Int. Cl.
*A63B 69/00* (2006.01)
*A63B 69/16* (2006.01)
*B62H 7/00* (2006.01)

(52) U.S. Cl.
CPC .............. *A63B 69/16* (2013.01); *B62H 7/00* (2013.01); *A63B 2069/163* (2013.01); *A63B 2069/167* (2013.01)

(58) Field of Classification Search
None
See application file for complete search history.

(56) References Cited

U.S. PATENT DOCUMENTS 2,498,047 A * 2/1950 Myers .................... A63B 69/16
482/61
3,526,042 A * 9/1970 Nelson .............. G01M 17/0076
434/61

(Continued)

FOREIGN PATENT DOCUMENTS

BE 377201 A 3/1931
JP 50070133 A2 6/1975

(Continued)

OTHER PUBLICATIONS

International Search Report dated Nov. 10, 2015 filed in PCT/JP2015/073695.

(Continued)

*Primary Examiner* — Stephen R Crow
(74) *Attorney, Agent, or Firm* — Rankin, Hill & Clark LLP

(57) ABSTRACT

To provide a bicycle trainer with which a wheel is less likely to come off even during low-speed running. A bicycle trainer 100 includes a pair of front wheel rollers 10 and 12 to support a front wheel of a bicycle, a pair of rear wheel rollers 20 and 22 to support a rear wheel of the bicycle, and a belt 66 to transmit a rotation of the rear wheel roller 20 to the front wheel rollers 10 and 12. The front wheel rollers 10 and 12 support the front wheel of the bicycle such that a trail when the front wheel of the bicycle is put on the front wheel rollers 10 and 12 becomes equivalent to a trail when the bicycle actually runs on a road surface. The bicycle trainer 100 further includes front wheel roller adjusters 14 and 16 and rear wheel roller adjusters 24 and 26. The front wheel roller adjusters 14 and 16 adjust postures of the front wheel rollers 10 and 12 such that contact positions where the front wheel of the bicycle contacts the front wheel rollers 10 and 12 become constant. The rear wheel roller adjusters 24 and (Continued)

26 adjust positions of the rear wheel rollers 20 and 22 according to a driving power or a fictitious force of the bicycle.

5 Claims, 11 Drawing Sheets

(56) References Cited

U.S. PATENT DOCUMENTS

| | | | | |
|---|---|---|---|---|
| 3,871,648 | A * | 3/1975 | Maurer, III | A63B 69/16 |
| | | | | 434/61 |
| 4,415,152 | A | 11/1983 | Smith | |
| 4,802,666 | A * | 2/1989 | Rodriqguez | A63B 69/16 |
| | | | | 280/293 |
| 4,925,183 | A | 5/1990 | Kim | |
| 4,958,832 | A | 9/1990 | Kim | |
| 5,662,559 | A * | 9/1997 | Vasquez | A63B 22/16 |
| | | | | 434/61 |
| 6,123,547 | A * | 9/2000 | Teresi | G09B 9/042 |
| | | | | 434/61 |
| 6,500,098 | B1 * | 12/2002 | Werner | A63B 69/16 |
| | | | | 482/57 |
| 6,857,992 | B1 * | 2/2005 | Kolda | A63B 21/0051 |
| | | | | 482/61 |
| 7,060,009 | B2 * | 6/2006 | Greenleaf | A63B 69/16 |
| | | | | 482/54 |
| 7,942,790 | B2 * | 5/2011 | Papadopoulos | A63B 69/16 |
| | | | | 482/61 |
| 8,029,419 | B2 * | 10/2011 | Wan | A63B 69/16 |
| | | | | 482/61 |
| 8,419,597 | B2 * | 4/2013 | Cooper | A63B 24/0087 |
| | | | | 482/51 |
| 8,430,794 | B2 * | 4/2013 | Shimizu | F16H 61/0206 |
| | | | | 475/114 |
| 8,430,797 | B2 * | 4/2013 | Wan | A63B 69/16 |
| | | | | 482/61 |
| 8,636,629 | B2 * | 1/2014 | Zwinkels | A63B 69/16 |
| | | | | 482/61 |
| 9,295,894 | B2 * | 3/2016 | Papadopolous | A63B 69/16 |
| 2002/0055422 | A1 * | 5/2002 | Airmet | A63B 22/16 |
| | | | | 482/61 |
| 2006/0217237 | A1 * | 9/2006 | Rhodes | A63B 21/225 |
| | | | | 482/61 |
| 2007/0060453 | A1 | 3/2007 | Papadopoulos | |
| 2007/0202998 | A1 * | 8/2007 | Wan | A63B 26/003 |
| | | | | 482/61 |
| 2010/0234188 | A1 * | 9/2010 | Wan | A63B 69/16 |
| | | | | 482/61 |
| 2011/0287901 | A1 * | 11/2011 | Wan | A63B 69/16 |
| | | | | 482/57 |

FOREIGN PATENT DOCUMENTS

| | | |
|---|---|---|
| JP | 64020883 A2 | 2/1989 |
| JP | 0277060 | 6/1990 |
| JP | 02136674 | 11/1990 |
| JP | 11197267 A2 | 7/1999 |
| JP | 2009507612 T2 | 2/2009 |
| WO | 9619264 A1 | 6/1996 |

OTHER PUBLICATIONS

"LiveRoll R700", retrieved on Oct. 18, 2014, URL:http://www.minoura.jp/japan/trainer/rollers/r700.html.
A still image retrieved from URL:https://www.youtube.com/watch?v=USnC-OKOhaA on Jun. 8, 2012.
A still image retrieved from URL:https://www.youtube.com/watch?v=fZKjnwJneZY on Nov. 16, 2010.
Extended European Search Report (EESR) dated Mar. 1, 2018 for the corresponding European Patent Application No. 15854215.9.

* cited by examiner

FIG. 3
(a)
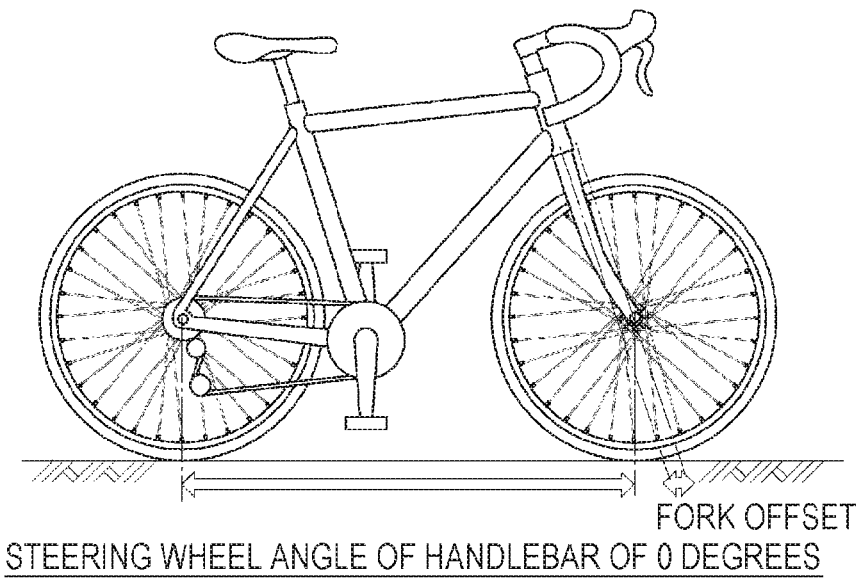
FORK OFFSET
STEERING WHEEL ANGLE OF HANDLEBAR OF 0 DEGREES
(b)
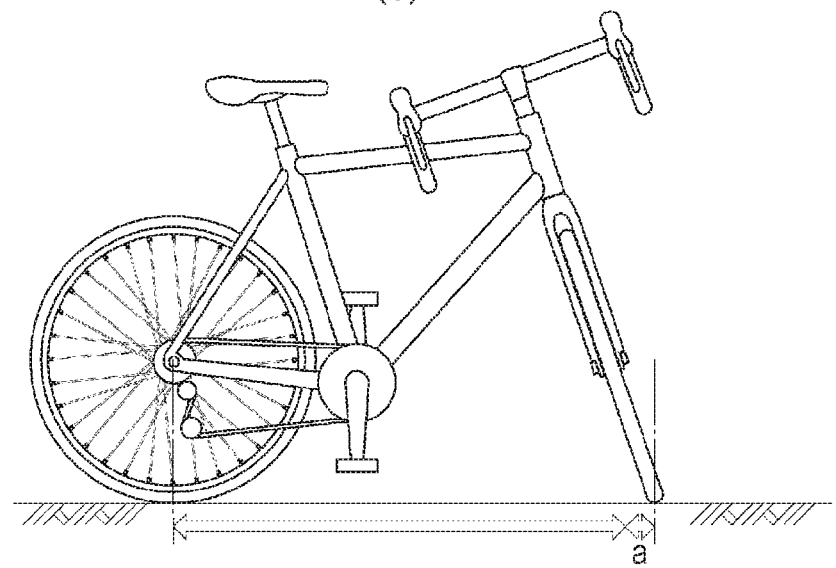
a
STEERING WHEEL ANGLE OF HANDLEBAR OF 90 DEGREES

FIG. 4
(a)
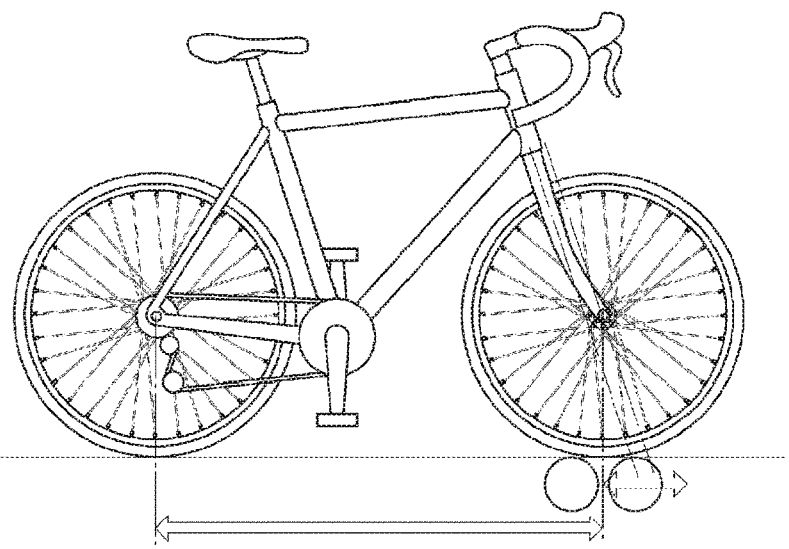
STEERING WHEEL ANGLE OF HANDLEBAR OF 0 DEGREES
(b)
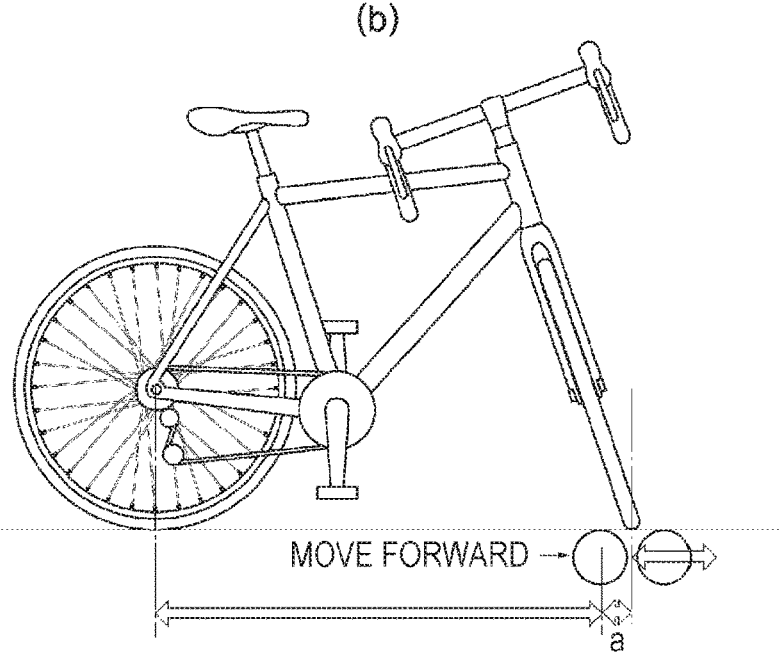
MOVE FORWARD →
a
STEERING WHEEL ANGLE OF HANDLEBAR OF 90 DEGREES FIG. 11
(a)
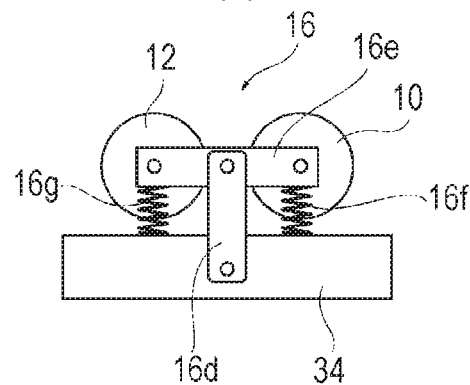
(b)
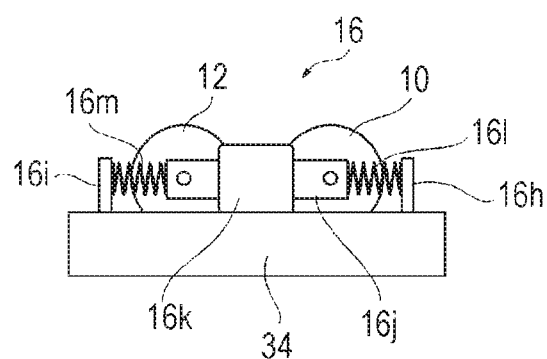
(c)
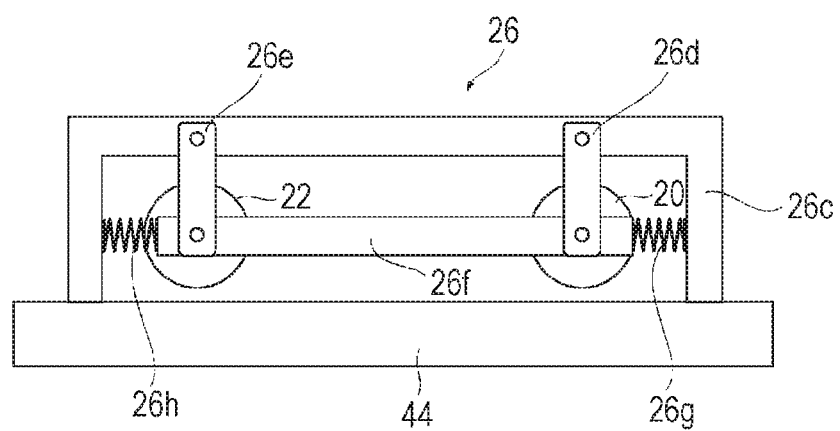

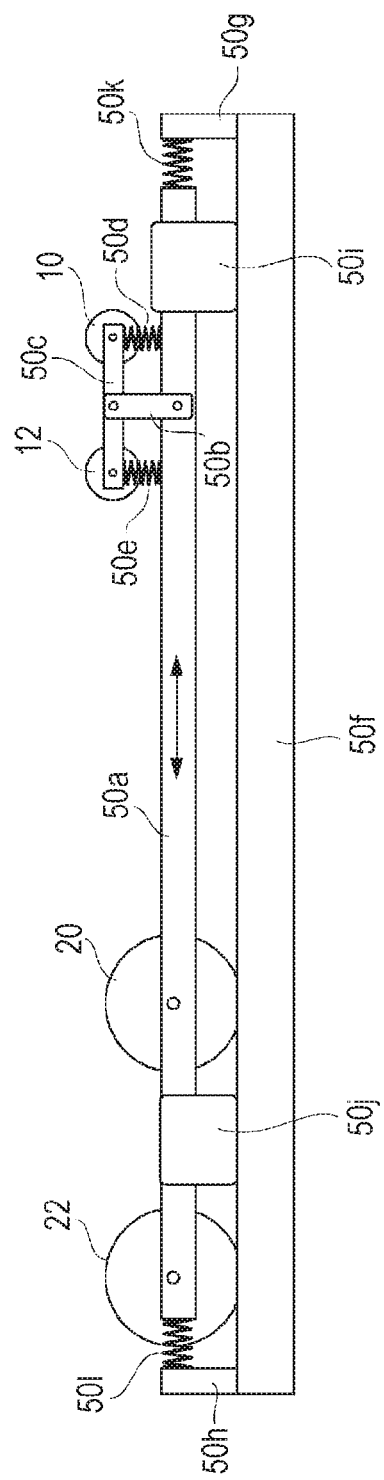

BICYCLE TRAINER

TECHNICAL FIELD

The present invention relates to a bicycle trainer for self-standing running practice of a bicycle and especially relates to a bicycle trainer with which a wheel is less likely to come off even during low-speed running.

BACKGROUND ART

As a typical bicycle trainer, for example, techniques disclosed in PATENT LITERATURE 1 and NON-PATENT LITERATURE 1 have been known.

The techniques disclosed in PATENT LITERATURE 1 and NON-PATENT LITERATURE 1 include one front wheel roller to support a front wheel of a bicycle, a pair of rear wheel rollers to support a rear wheel of the bicycle, and a belt to transmit a rotation of the rear wheel rollers to the front wheel roller. Putting the front wheel of the bicycle to the front wheel roller and the rear wheel of the bicycle to the rear wheel rollers and rotating pedals rotates the rear wheel rollers and drives the front wheel roller via the belt, thus ensuring self-standing running practice of the bicycle on the spot. Such bicycle trainer using the three rollers is referred to as a three-roller bicycle trainer.

CITATION LIST

Patent Literature

PATENT LITERATURE 1: JP-UM-A-2-77060
NON-PATENT LITERATURE 1: "LiveRoll R700," [online], March, 2013, MINOURA JAPAN, searched through the Internet <URL:http://www.minoura.jp/japan/trainer/rollers/r700.html> on Oct. 18, 2014

SUMMARY OF THE INVENTION

Problems to be Solved by the Invention

However, the three-roller bicycle trainer has the following problems.

First, an incorrect handlebar operation destabilizes a posture of the bicycle. If the posture of the bicycle is once destabilized, a correction of the posture is difficult and therefore a wheel is likely to come off.

Secondly, there is a problem in which it is difficult to make a stable running without running the bicycle at a speed of 20 to 30 [km/h] or more to keep generating a gyro effect, due to the first problem.

Thirdly, for training, an application of a load to the bicycle by a load device reduces the speed of the bicycle, making the stable running difficult due to the second problem.

Fourthly, a riding out of saddle (standing pedaling) causes a problem that the wheel is likely to come off.

A situation where the wheel is likely to come off with the three-roller bicycle trainer can be specifically confirmed at the Internet sites:
"https://www.youtube.com/watch?v=USnC-OKOhaA" and
"https://www.youtube.com/watch?v=fZKjnwJneZY".

The present invention has focused on the unsolved problems that the known techniques have. An object of the present invention is to provide a bicycle trainer with which the wheel is less likely to come off even during low-speed running.

Solutions to the Problems

[Principle] Operational Feeling of Handlebar

Through intensive examinations, the inventor has hit upon the present invention based on the following knowledge.

The inventor has found that one cause of the loss of the wheel in the first to third problems comes from peculiar operational feeling of handlebar different from operational feeling in actual running. Through further detailed examinations, the inventor has found that a cause of the operational feeling of handlebar being different from the operational feeling in the actual running comes from a difference in trail from the actual running.

FIGS. 1(a) to 1(c) are drawings to describe the difference in trail of the three-roller bicycle trainer from the actual running.

The trail affects the operational feeling of handlebar. As illustrated in FIG. 1(a), the trail means a horizontal distance between a point where a steering axis of a steering tube is extended and intersects with a road surface and a point where a front wheel contacts the road surface (a point where a line vertically drawn from a wheel axis of the front wheel intersects with the road surface). A long trail enhances stability in straight running. A factor that the bicycle runs straight even if hands are released from the handlebar comes from the long trail. In contrast to this, a short trail enhances maneuverability. A factor that a handling becomes light and quick comes from the shortness of the trail. The trail is the factor to determine the stability in straight running and steerability, and these factors are in a trade-off relationship. That is, although the long trail deteriorates the maneuverability, the stability in straight running is enhanced. Conversely, although the short trail deteriorates the stability in straight running, the steerability is enhanced.

However, as illustrated in FIG. 1(b), in the three-roller bicycle trainer, a point where the front wheel of the bicycle contacts the front wheel roller (hereinafter referred to as a "front wheel contact point") is disposed forward with respect to a point where a line vertically drawn from a wheel axis of the front wheel intersects with the road surface. In view of this, with the three-roller bicycle trainer, the trail becomes shorter than that of the actual running. Since the front wheel roller is disposed forward with respect to the front wheel, a force of sinking down the front wheel is generated. This generates the peculiar operational feeling of the handlebar different from the operational feeling in the actual running; therefore, the handlebar operation is likely to be mistaken. Due to these causes, the handlebar operation is likely to be mistaken with the three-roller bicycle trainer. Furthermore, once the posture of the bicycle is destabilized, a situation that the correction of the posture is difficult occurs.

Therefore, as illustrated in FIG. 1(c), the present invention supports the front wheel of the bicycle with two front wheel rollers. This secures the trail in a state close to the actual running to improve the operational feeling of the handlebar.

FIG. 2 is a drawing illustrating a state of contacting the front wheel of the bicycle with the front wheel rollers.

Furthermore, as illustrated in FIG. 2, with the configuration that the two front wheel rollers support the front wheel of the bicycle, the front wheel of the bicycle contacts the front wheel rollers at two points. This generates a straight movement force in the front wheel, allowing the trail to be secured in the state further close to the actual running.

[Invention 1]

To achieve the object, a bicycle trainer according to the invention 1 includes a pair of front wheel rollers that supports a front wheel of a bicycle, a pair of rear wheel rollers that supports a rear wheel of the bicycle, and a rotation synchronizing unit configured to synchronize a rotation of the front wheel rollers with a rotation of the rear wheel rollers.

With this configuration, putting the front wheel of the bicycle to the front wheel rollers and the rear wheel of the bicycle to the rear wheel rollers and rotating pedals rotates one of the rollers and drives the other rollers by the rotation synchronizing unit, allowing the self-standing running practice of the bicycle on the spot.

The present invention is applicable to a bicycle with a front wheel as a driving wheel, in addition to a bicycle with a rear wheel as the driving wheel. Furthermore, the present invention is also applicable to a bicycle with a rear wheel and a front wheel both working as the driving wheels.

The rotation synchronizing unit includes, for example, a configuration that includes: (1) a belt that transmits the rotation of the rear wheel rollers to the front wheel rollers or (2) a detecting unit such as a rotary encoder that detects a rotating state of the rear wheel rollers and a driving unit such as a motor that rotates the front wheel rollers so as to synchronize with the rotation of the rear wheel rollers based on a detection result by the detecting unit. An application of the present invention to the bicycle with the front wheel as the driving wheel or an application of the bicycle with the rear wheel and the front wheel both working as the driving wheels also includes a configuration similar to these configurations.

[Invention 2]

Furthermore, a bicycle trainer according to the invention 2 is the bicycle trainer according to the invention 1 configured as follows. The front wheel rollers support the front wheel of the bicycle such that a trail when the front wheel of the bicycle is put on the front wheel rollers becomes equivalent to a trail when the bicycle actually runs on a road surface.

This configuration supports the front wheel of the bicycle such that the trail when the front wheel of the bicycle is put on the front wheel rollers and the rear wheel of the bicycle is put on the rear wheel rollers becomes equivalent to the trail in the actual running.

[Principle] Loss of Front Wheel

Through the intensive examinations, the inventor has hit upon the present invention based on the following knowledge.

The inventor has found that, with the first to third problems, one cause of the loss of the wheel comes from a change in distance between a point where the rear wheel of the bicycle contacts the rear wheel roller (hereinafter referred to as a "rear wheel contact point") and the front wheel contact point when the handlebar is turned.

FIGS. 3(a) and 3(b) are drawings to describe the change in distance between the rear wheel contact point and the front wheel contact point when the handlebar is turned.

With a steering wheel angle of the handlebar of 0 degrees, as illustrated in FIG. 3(a), the distance between the rear wheel contact point and the front wheel contact point is a distance between the point where the line vertically drawn from the wheel axis of the front wheel intersects with the road surface and the point where the line vertically drawn from the wheel axis of the rear wheel intersects with the road surface.

In contrast to this, with the steering wheel angle of the handlebar of 90 degrees, as illustrated in FIG. 3(b), the distance between the rear wheel contact point and the front wheel contact point becomes longer than the distance with the steering wheel angle of the handlebar of 0 degrees by a distance a. The distance a can be obtained by the following formula (1). In the following formula (1), a fork offset means a horizontal distance between a point where a steering axis of a steering tube is extended and intersects with the road surface and a point where a line extended from the wheel axis of the front wheel parallel to the steering axis of the steering tube intersects with the road surface.

$$a = (\text{radius of front wheel} \times \sin \text{head angle}) - \text{fork offset} \quad (1)$$

For example, with 27-inch road bike, $a = (350 \text{ [mm]} \times \sin 18 \text{ [°]}) - 50 \text{ [mm]} \approx 58 \text{ [mm]}$ is met.

Thus, the steering wheel angle of the handlebar changes the distance between the rear wheel contact point and the front wheel contact point. In despite of this, the three-roller bicycle trainer secures a position of the front wheel roller. Therefore, as the steering wheel angle of the handlebar increases, the front wheel contact point moves forward of the front wheel roller. This not only makes the trail short but also is likely to come off the wheel forward. It is considered that this is a cause of the wheel being likely to come off especially during the steering of the handlebar in the video in the above-described Internet site.

FIGS. 4(a) and 4(b) are drawings illustrating a configuration of moving the front wheel rollers following the change in distance between the rear wheel contact point and the front wheel contact point.

As illustrated in FIGS. 4(a) and 4(b), the present invention moves the front wheel rollers following the change in distance between the rear wheel contact point and the front wheel contact point, thus causing the wheel to be less likely to come off even if the handlebar is turned. That is, as illustrated in FIG. 4(b), when the handlebar is turned, the front wheel rollers move forward, the distance a is absorbed, and the two front wheel rollers always contact the front wheel at fixed positions.

[Invention 3]

Furthermore, a bicycle trainer according to the invention 3 is the bicycle trainer according to any one of the inventions 1 and 2 that includes a front wheel roller adjusting unit. The front wheel roller adjusting unit is configured to adjust positions or postures of the front wheel rollers such that contact positions where the front wheel of the bicycle contacts the front wheel rollers become constant.

With this configuration, when the handlebar is turned, the front wheel roller adjusting unit adjusts the positions or the postures of the front wheel rollers such that the contact positions where the front wheel of the bicycle contacts the front wheel rollers become constant.

[Invention 4]

Furthermore, a bicycle trainer according to the invention 4 is the bicycle trainer according to the invention 3 configured as follows. The front wheel roller adjusting unit includes a front wheel roller support unit and a front wheel side biasing unit. The front wheel roller support unit supports the front wheel rollers such that the positions or the postures of the front wheel rollers are changeable. The front wheel side biasing unit biases the front wheel roller support unit such that the positions or the postures of the front wheel rollers return to reference positions or postures.

With this configuration, when the handlebar is turned, the front wheel roller adjusting unit is configured to adjust the positions or the postures of the front wheel rollers such that contact positions where the front wheel of the bicycle contacts the front wheel rollers become constant. When the handlebar is returned to an original position, a biasing force from the front wheel side biasing unit returns the positions or the postures of the front wheel rollers to the reference positions or postures. This enhances a following capability to the change in distance between the rear wheel contact point and the front wheel contact point.

[Principle] Loss of Rear Wheel, and Vibrations and Noises

Through intensive examinations, the inventor has hit upon the present invention based on the following knowledge.

The inventor has found that one cause of the loss of the wheel in the fourth problem is as follows. Since the standing pedaling generates unevenness in the driving power of the bicycle and a fictitious force in the bicycle, the bicycle cannot resist the driving power or the fictitious force.

With the three-roller bicycle trainer, since the standing pedaling generates the unevenness in the driving power of the bicycle and the fictitious force in the bicycle, the bicycle cannot resist the driving power or the fictitious force. This makes the wheel to be likely to come off in a front-rear direction. This is considered as a cause of the wheel being likely to come off especially during the standing pedaling in the video in the above-described Internet site.

FIG. 5 is a drawing illustrating a configuration of moving the rear wheel rollers according to the driving power or the fictitious force of the bicycle.

As illustrated in FIG. 5, the present invention moves the rear wheel rollers according to the driving power or the fictitious force of the bicycle to make the wheel less likely to come off by the standing pedaling. That is, the standing pedaling moves the rear wheel rollers rearward and absorbs the unevenness in driving power and the fictitious force.

The configuration of moving the rear wheel rollers is also effective to the problems of vibrations and noises.

The three-roller bicycle trainer has problems of many rotating components and large vibrations and noises.

Therefore, to solve the problems of the vibrations and noises, the inventor has examined the problems in details. As a result, the inventor has found that a variation in rigidity of the rear wheel causes the problems.

FIGS. 6(a) to 6(d) are drawings to describe a prevention of the vibrations and noises by moving the rear wheel rollers.

As illustrated in FIG. 6(d), a peripheral edge of a tire is partially hard. This is because that, in terms of a structure of the tire, the tire includes a non-uniformly deformed site due to a joint of a casing, a variation in rubber thickness, and the like. If this hard part in the tire passes through the rear wheel rollers, large vibrations and noises occur due to the impact.

In contrast to this, as illustrated in FIGS. 6(a) to 6(c), when this hard part in the rear wheel passes through the rear wheel rollers, the rear wheel rollers move rearward and absorb the impact. With the three-roller bicycle trainer, this allows impact energy transmitted to a floor to be converted into the energy in the front-rear direction, thereby ensuring reducing the vibrations and noises. With the front wheel side as well, when this hard part in the front wheel passes through the front wheel rollers, the front wheel rollers move forward and absorb the impact. This ensures obtaining the similar effect.

[Invention 5]

Furthermore, a bicycle trainer according to the invention 5 is the bicycle trainer according to any one of the inventions 1 to 4 that includes a rear wheel roller adjusting unit. The rear wheel roller adjusting unit is configured to adjust positions or postures of the rear wheel rollers according to a driving power or a fictitious force of the bicycle.

With this configuration, when the standing pedaling is performed, the rear wheel roller adjusting unit adjusts the positions or the postures of the rear wheel rollers according to the driving power or the fictitious force of the bicycle.

[Invention 6]

Furthermore, a bicycle trainer according to the invention 6 in the bicycle trainer according to the invention 5 is configured as follows. The rear wheel roller adjusting unit includes a rear wheel roller support unit and a rear wheel side biasing unit. The rear wheel roller support unit supports the rear wheel rollers such that the positions or the postures of the rear wheel rollers are changeable. The rear wheel side biasing unit biases the rear wheel roller support unit such that the positions or the postures of the rear wheel rollers return to reference positions or postures.

With this configuration, according to the driving power or the fictitious force of the bicycle, even if the positions or the postures of the rear wheel rollers change, when the driving power or the fictitious force decreases, a biasing force by the rear wheel side biasing unit returns the positions or the postures of the rear wheel rollers to the reference positions or postures. This enhances the following capability to the driving power or the fictitious force.

[Invention 7]

Furthermore, a bicycle trainer according to the invention 7 in the bicycle trainer according to any one of the inventions 1 to 6 includes a front wheel frame, a rear wheel frame, and a coupling unit. The front wheel frame is to install the front wheel rollers. The rear wheel frame is to install the rear wheel rollers. The coupling unit couples the front wheel frame and the rear wheel frame together such that a height of the front wheel frame with respect to the rear wheel frame is adjustable.

With this configuration, the coupling unit ensures adjusting the height of the front wheel frame with respect to the rear wheel frame. This ensures the self-standing running practice of the bicycle with a stance of simulating slopes.

Effects of the Invention

As described above, the bicycle trainer according to the inventions 1 to 7 supports the front wheel of the bicycle with the pair of front wheel rollers. This ensures securing the trail in the state close to the actual running. Furthermore, this ensures reducing a degree of difference in the operational feeling of the handlebar from the actual running. Additionally, the front wheel of the bicycle contacts the front wheel rollers at the two points. Therefore, the front wheel generates the straight movement force, thereby allowing the trail to secure the state further close to the actual running. Accordingly, compared with the typical bicycle trainer, the wheel is less likely to come off even during the low-speed running.

Furthermore, the bicycle trainer according to the invention 2 supports the front wheel of the bicycle such that the trail becomes equivalent to that of the actual running. This ensures further reducing the degree of difference in the operational feeling of the handlebar from the actual running.

Furthermore, even when the handlebar turned, the bicycle trainer according to the invention 3 or 4 adjusts the positions or the postures of the front wheel rollers such that the contact positions where the front wheel of the bicycle contacts the front wheel rollers constant. Accordingly, the wheel is less likely come off forward. This also ensures preventing the trail from shortening when the handlebar is turned. This ensures reducing the degree of difference in the operational feeling of the handlebar from the actual running. Furthermore, when the hard part of the front wheel passes through the front wheel rollers, the front wheel rollers move forward or change the postures to absorb the impact. This ensures the reduction in vibrations and noises.

Furthermore, even when the standing pedaling is performed, the bicycle trainer according to the invention 5 or 6 adjusts the positions or the postures of the rear wheel rollers according to the driving power or the fictitious force of the bicycle. This makes the wheel to be less likely to come off in the front-rear direction. When the hard part of the rear wheel passes through the rear wheel rollers, the rear wheel rollers move rearward or change the postures to absorb the impact. This ensures the reduction in vibrations and noises.

BRIEF DESCRIPTION OF THE DRAWINGS

FIGS. 3(a) and 3(b) are drawings to describe a change in distance between a rear wheel contact point and a front wheel contact point when a handlebar is turned.

FIGS. 4(a) and 4(b) are drawings illustrating a configuration of moving the front wheel rollers following the change in the distance between the rear wheel contact point and the front wheel contact point.

FIGS. 11(a) to 11(c) are drawings illustrating modifications of the front wheel roller adjuster 16 and the rear wheel roller adjuster 26.

FIG. 12 is a drawing illustrating modifications of the front wheel roller adjuster 16 and the rear wheel roller adjuster 26.

DESCRIPTION OF EMBODIMENTS

The following describes an embodiment of the present invention. FIG. 7 to FIG. 10 are drawings illustrating the embodiment.

First, the following describes a configuration of the embodiment.

Figure 7:
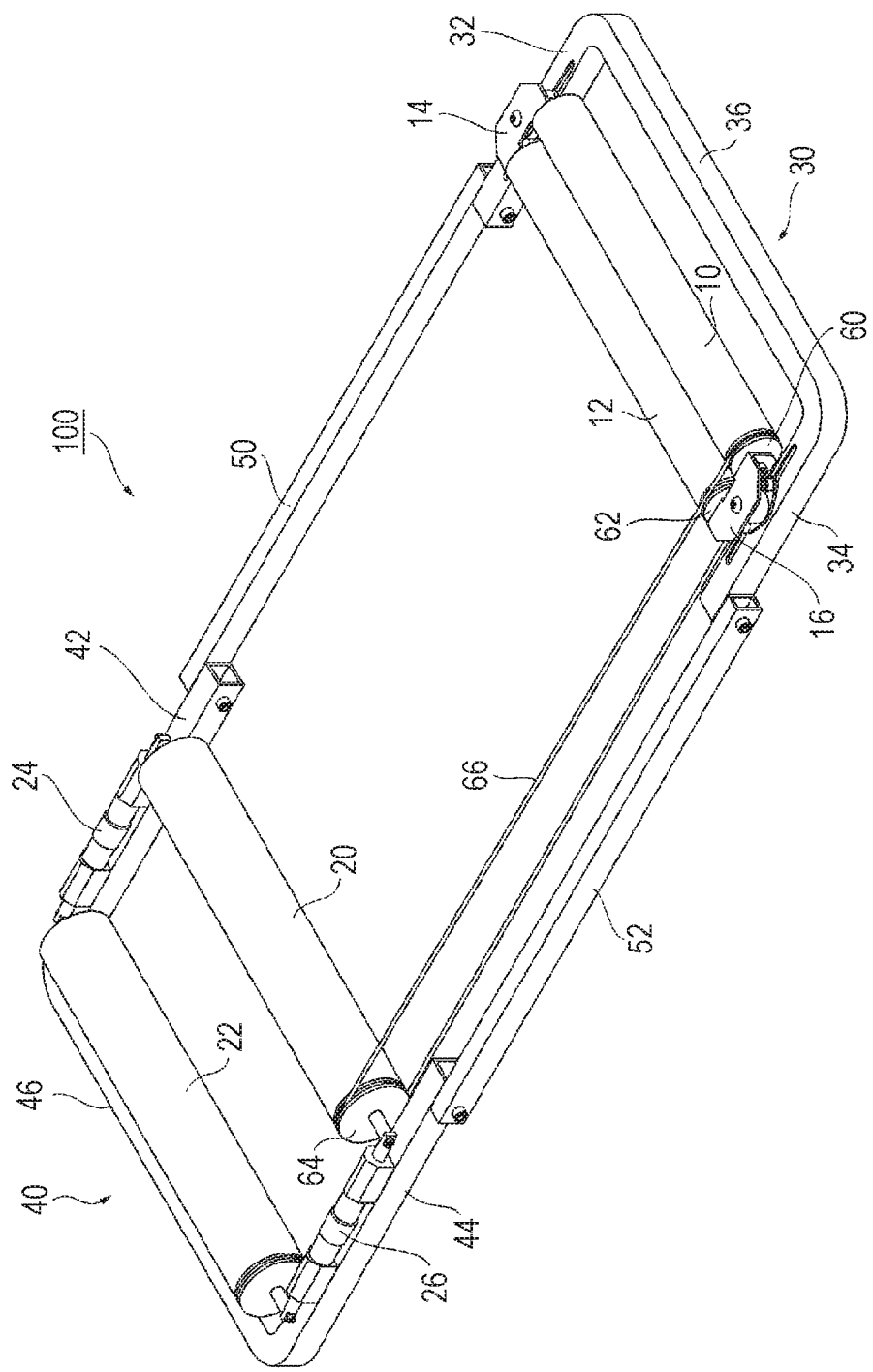
FIG. 7 is a perspective view of a bicycle trainer 100.

FIG. 7 is a perspective view of a bicycle trainer 100.

As illustrated in FIG. 7, the bicycle trainer 100 includes a pair of front wheel rollers 10 and 12 to support a front wheel of a bicycle, a pair of rear wheel rollers 20 and 22 to support a rear wheel of the bicycle, a front wheel frame 30 to install the front wheel rollers 10 and 12, a rear wheel frame 40 to install the rear wheel rollers 20 and 22, and coupling frames 50 and 52 to couple the front wheel frame 30 and the rear wheel frame 40 together.

The front wheel frame 30 includes a left frame 32 extending in a front-rear direction, a right frame 34 disposed parallel opposed to the left frame 32 with a predetermined interval, and a front frame 36 coupling a front end of the left frame 32 and a front end of the right frame 34 together. The left frame 32 includes a front wheel roller adjuster 14 to support left ends of the front wheel rollers 10 and 12. The right frame 34 includes a front wheel roller adjuster 16 to support right ends of the front wheel rollers 10 and 12.

The front wheel rollers 10 and 12 are horizontally disposed such that their axial directions are perpendicular to the front-rear direction. It is preferable that the front wheel roller 10 be disposed forward with respect to the front wheel roller 12 and positioned forward around 10 to 20 [mm] by horizontal distance from a line vertically drawn from the wheel axis of the front wheel.

The front wheel rollers 10 and 12 are disposed parallel to one another with the predetermined interval. A long distance between an axis of the front wheel roller 10 and an axis of the front wheel roller 12 (hereinafter referred to as a "distance between the front wheel rollers") lengthens the trail. A short distance between the front wheel rollers shortens the trail. In view of this, the distance between the front wheel rollers is configured such that the trail when the front wheel of the bicycle is put on the front wheel rollers 10 and 12 becomes equivalent to the trail when the bicycle actually runs on a road surface. For example, with the 27-inch road bike, the distance between the front wheel rollers is preferably set to around 40 to 60 [mm].

The rear wheel frame 40 includes a left frame 42 extending in the front-rear direction, a right frame 44 disposed parallel opposed to the left frame 42 with a predetermined interval, and a rear frame 46 coupling a rear end of the left frame 42 and a rear end of the right frame 44 together. The left frame 42 includes a rear wheel roller adjuster 24 to support left ends of the rear wheel rollers 20 and 22. The right frame 44 includes a rear wheel roller adjuster 26 to support right ends of the rear wheel rollers 20 and 22.

The rear wheel rollers 20 and 22 are horizontally disposed such that their axial directions are perpendicular to the front-rear direction. The rear wheel roller 20 is disposed forward with respect to the rear wheel roller 22. The interval between the rear wheel rollers 20 and 22 is set such that the line vertically drawn from the wheel axis of the rear wheel is positioned at the center of the rear wheel rollers 20 and 22.

The rear wheel rollers 20 and 22 are disposed parallel to one another with the predetermined interval. For example, with the 27-inch road bike, a distance between an axis of the rear wheel roller 20 and an axis of the rear wheel roller 22 (hereinafter referred to as a "distance between the rear wheel rollers") is preferably set to around 230 to 260 [mm].

A pulley 60 with a diameter identical to that of the front wheel roller 10 is mounted concentrically with the front wheel roller 10 at the left end of the front wheel roller 10. A pulley 62 with a diameter identical to that of the front wheel roller 12 is mounted concentrically with the front wheel roller 12 at the left end of the front wheel roller 12. A pulley 64 with a diameter identical to that of the rear wheel roller 20 is mounted concentrically with the rear wheel roller 20 at the left end of the rear wheel roller 20. A belt 66 is wound around the pulleys 60 to 64. This transmits the rotation of the rear wheel roller 20 to the front wheel rollers 10 and 12 via the belt 66.

Figure 8:
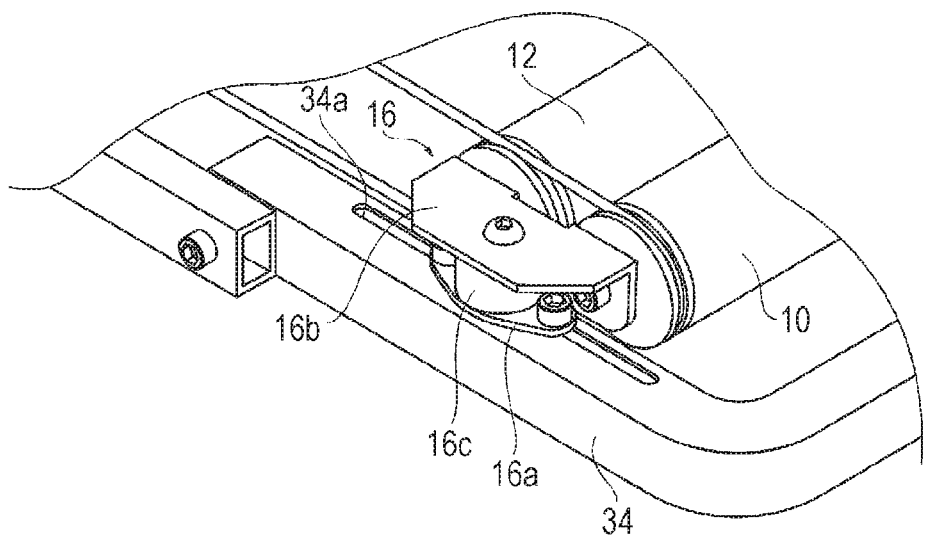
FIG. 8 is a perspective view enlarging a periphery of a front wheel roller adjuster 16.

FIG. 8 is a perspective view enlarging a periphery of the front wheel roller adjuster 16.

The front wheel roller adjuster 16 adjusts the postures of the front wheel rollers 10 and 12 such that the contact positions where the front wheel of the bicycle contacts the front wheel rollers 10 and 12 become constant.

As illustrated in FIG. 8, the front wheel roller adjuster 16 includes a lower plate 16a secured to a top surface of the right frame 34, an L-shaped top plate 16b, and an elastic member 16c such as rubber. The L-shaped top plate 16b is formed of a side surface plate secured to shafts of the front wheel rollers 10 and 12 and a top surface plate orthogonally bent from an upper end of the side surface plate. The elastic member 16c is disposed between the lower plate 16a and the top surface plate of the L-shaped top plate 16b.

An application of a forward load to the front wheel rollers 10 and 12 deforms the elastic member 16c and inclines the front wheel rollers 10 and 12 forward. Afterwards, when the forward load decreases, the biasing force (a restoring force) by the elastic member 16c returns the front wheel rollers 10 and 12 to the reference postures. Conversely, an application of a rearward load to the front wheel rollers 10 and 12 deforms the elastic member 16c and inclines the front wheel rollers 10 and 12 rearward. Afterwards, when the rearward load decreases, the biasing force by the elastic member 16c returns the front wheel rollers 10 and 12 to the reference postures.

A groove 34a, which extends in the front-rear direction, is formed on a top surface of the right frame 34. The lower plate 16a is secured to the right frame 34 via the groove 34a with a bolt or the like. This ensures securing the lower plate 16a to any given position in the groove 34a. This allows appropriately setting the positions of the front wheel rollers 10 and 12 according to a size of the bicycle.

The front wheel roller adjuster 14 also has a configuration similar to the front wheel roller adjuster 16.

Figure 9:
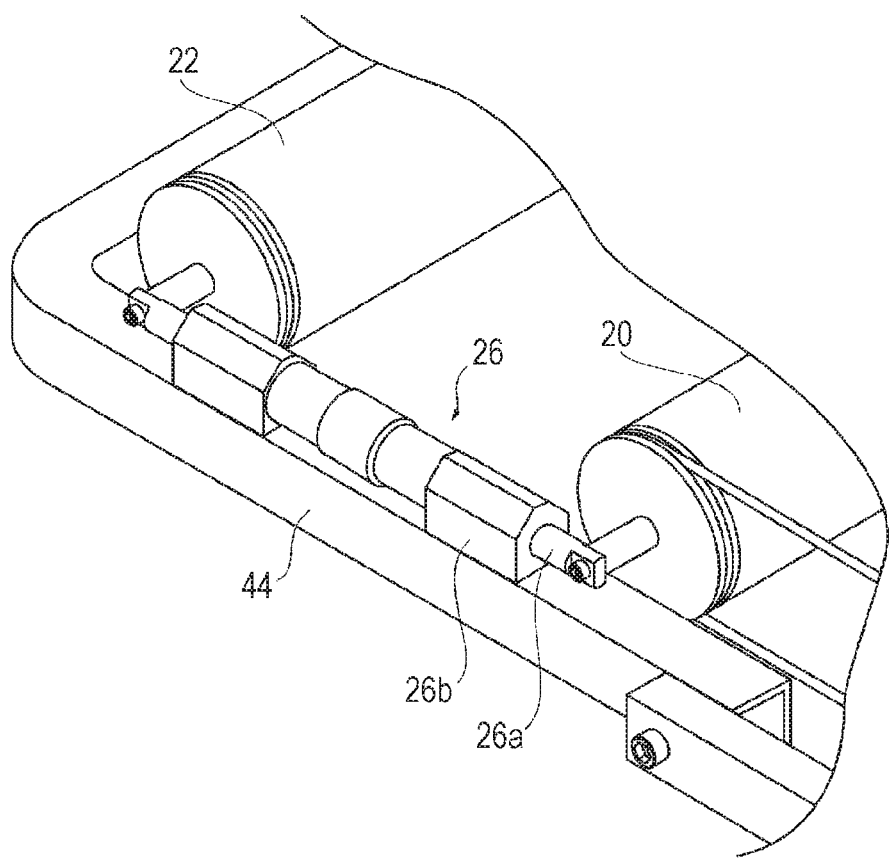
FIG. 9 is a perspective view enlarging a periphery of a rear wheel roller adjuster 26.

FIG. 9 is a perspective view enlarging a periphery of the rear wheel roller adjuster 26.

The rear wheel roller adjuster 26 adjusts the positions of the rear wheel rollers 20 and 22 according to the driving power or the fictitious force of the bicycle.

As illustrated in FIG. 9, the rear wheel roller adjuster 26 includes a coupling rod 26a and a parallel slide mechanism 26b such as a linear guide. The coupling rod 26a couples the shaft of the rear wheel roller 20 with the shaft of the rear wheel roller 22 together. The parallel slide mechanism 26b movably supports the coupling rod 26a in the front-rear direction.

The parallel slide mechanism 26b is secured to a top surface of the right frame 44. The parallel slide mechanism 26b supports the coupling rod 26a to be movable forward and rearward. The parallel slide mechanism 26b biases the coupling rod 26a such that a position of the coupling rod 26a returns to the reference position. A moving amount of the coupling rod 26a is around 5 [mm] forward and around 5 [mm] rearward.

An application of a forward load to the rear wheel rollers 20 and 22 moves the rear wheel rollers 20 and 22 forward according to the load. Afterwards, when the forward load decreases, the biasing force from the parallel slide mechanism 26b returns the rear wheel rollers 20 and 22 to the reference positions. Conversely, an application of a rearward load to the rear wheel rollers 20 and 22 moves the rear wheel rollers 20 and 22 rearward according to the load. Afterwards, when the rearward load decreases, the biasing force from the parallel slide mechanism 26b returns the rear wheel rollers 20 and 22 to the reference positions.

A rear wheel roller adjuster 24 also has a configuration similar to the rear wheel roller adjuster 26.

Figure 10:
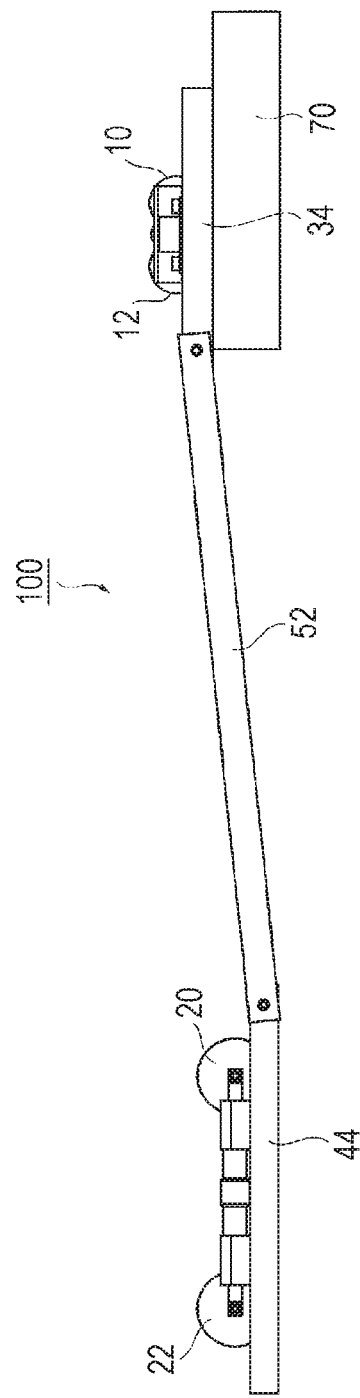
FIG. 10 is a right side view of the bicycle trainer 100 in the case where a front wheel frame 30 is heightened.

FIG. 10 is a right side view of the bicycle trainer 100 in the case where the front wheel frame 30 is heightened.

A front end of the coupling frame 50 is rotatably coupled to a rear end of the left frame 32. A rear end of the coupling frame 50 is rotatably coupled to a front end of the left frame 42. Similarly, a front end of the coupling frame 52 is rotatably coupled to a rear end of the right frame 34. A rear end of the coupling frame 52 is rotatably coupled to a front end of the right frame 44. Accordingly, as illustrated in FIG. 10, the bicycle trainer 100 bends with the rear end of the front wheel frame 30 and the front end of the rear wheel frame 40 as nodal points. This ensures adjusting a height of the front wheel frame 30 with respect to the rear wheel frame 40. For example, as illustrated in FIG. 10, installing the front wheel frame 30 on a base 70 allows the self-standing running practice of the bicycle with the stance simulating the slopes.

The following describes operations of the embodiment.

The front wheel of the bicycle is supported such that the trail when the front wheel of the bicycle is put on the front wheel rollers 10 and 12 and the rear wheel of the bicycle is put on the rear wheel rollers 20 and 22 becomes equivalent to the trail in the actual running. Rotating the pedals rotates the rear wheel rollers 20 and 22 and drives the front wheel rollers 10 and 12 via the belt 66. This allows the self-standing running practice of the bicycle on the spot.

Turning the handlebar changes the distance between the rear wheel contact point and the front wheel contact point. However, the front wheel roller adjusters 14 and 16 adjust the postures of the front wheel rollers 10 and 12 such that the contact positions where the front wheel of the bicycle contacts the front wheel rollers 10 and 12 become constant. Returning the handlebar to the original position returns the postures of the front wheel rollers 10 and 12 to the reference postures by the biasing force from the elastic member 16c.

The standing pedaling generates the unevenness in the driving power of the bicycle and generates the fictitious force in the bicycle. However, the rear wheel roller adjusters 24 and 26 adjust the positions of the rear wheel rollers 20 and 22 according to the driving power or the fictitious force of the bicycle. When the driving power or the fictitious force decreases, the biasing force by the parallel slide mechanism 26b returns the positions of the rear wheel rollers 20 and 22 to the reference positions.

The following describes effects of the embodiment.

This embodiment includes the pair of front wheel rollers 10 and 12 to support the front wheel of the bicycle, the pair of rear wheel rollers 20 and 22 to support the rear wheel of the bicycle, and the belt 66 to transmit the rotation of the rear wheel roller 20 to the front wheel rollers 10 and 12.

This supports the front wheel of the bicycle by the pair of front wheel rollers 10 and 12. This ensures securing the trail in the state close to the actual running. Furthermore, this ensures reducing the degree of difference in the operational feeling of the handlebar from the actual running. Additionally, the front wheel of the bicycle contacts the front wheel rollers 10 and 12 at the two points. Therefore, the front wheel generates the straight movement force, thereby allowing the trail to secure the state further close to the actual running. Accordingly, compared with the typical bicycle trainer, the wheel is less likely to come off even during the low-speed running. When the low-speed running is possible, a load device is mounted to the bicycle trainer 100, making a high-load self-standing running practice possible.

Furthermore, in this embodiment, the front wheel rollers 10 and 12 support the front wheel of the bicycle such that the trail when the front wheel of the bicycle is put on the front wheel rollers 10 and 12 becomes equivalent to the trail when the bicycle actually runs on the road surface.

This supports the front wheel of the bicycle such that the trail becomes equivalent to that of the actual running. This ensures further reducing the degree of difference in the operational feeling of the handlebar from the actual running.

Furthermore, this embodiment includes the front wheel roller adjusters 14 and 16. The front wheel roller adjusters 14 and 16 are configured to adjust the postures of the front wheel rollers 10 and 12 such that the contact positions where the front wheel of the bicycle contacts the front wheel rollers 10 and 12 become constant.

This adjusts the postures of the front wheel rollers 10 and 12 such that the contact positions where the front wheel of the bicycle contacts the front wheel rollers 10 and 12 constant even when the handlebar is turned. Accordingly, the wheel is less likely come off forward. This also ensures preventing the trail from shortening when the handlebar is turned. This ensures reducing the degree of difference in the operational feeling of the handlebar from the actual running. Furthermore, when the hard part of the front wheel passes through the front wheel rollers 10 and 12, the front wheel rollers 10 and 12 change the postures forward to absorb the impact. This ensures the reduction in vibrations and noises.

Furthermore, with the embodiment, the front wheel roller adjusters 14 and 16 support the front wheel rollers 10 and 12 such that the postures of the front wheel rollers 10 and 12 are changeable. Furthermore, the front wheel roller adjusters 14 and 16 bias the front wheel rollers 10 and 12 such that the postures of the front wheel rollers 10 and 12 return to the reference postures.

Therefore, returning the handlebar to the original position returns the postures of the front wheel rollers 10 and 12 to the reference postures by the biasing force from the elastic member 16c. This enhances the following capability to the change in distance between the rear wheel contact point and the front wheel contact point.

Furthermore, the embodiment includes the rear wheel roller adjusters 24 and 26 that adjust the positions of the rear wheel rollers 20 and 22 according to the driving power or the fictitious force of the bicycle.

Even when the standing pedaling is performed, this adjusts the positions of the rear wheel rollers 20 and 22 according to the driving power or the fictitious force of the bicycle. This makes the wheel to be less likely to come off in the front-rear direction. When the hard part of the rear wheel passes through the rear wheel rollers 20 and 22, the rear wheel rollers 20 and 22 move rearward to absorb the impact. This ensures the reduction in vibrations and noises.

Furthermore, with the embodiment, the rear wheel roller adjusters 24 and 26 support the rear wheel rollers 20 and 22 such that the positions of the rear wheel rollers 20 and 22 are changeable. Further, the rear wheel roller adjusters 24 and 26 bias the rear wheel rollers 20 and 22 such that the positions of the rear wheel rollers 20 and 22 return to the reference positions.

Therefore, according to the driving power or the fictitious force of the bicycle, even if the positions of the rear wheel rollers 20 and 22 change, when the driving power or the fictitious force decreases, the biasing force by the parallel slide mechanism 26b returns the positions of the rear wheel rollers 20 and 22 to the reference positions. This enhances the following capability to the driving power or the fictitious force.

Furthermore, this embodiment includes the front wheel frame 30, the rear wheel frame 40, and the coupling frames 50 and 52. The front wheel frame 30 is to install the front wheel rollers 10 and 12. The rear wheel frame 40 is to install the rear wheel rollers 20 and 22. The coupling frames 50 and 52 couple the front wheel frame 30 and the rear wheel frame 40 together such that the height of the front wheel frame 30 with respect to the rear wheel frame 40 is adjustable.

This ensures adjusting the height of the front wheel frame 30 with respect to the rear wheel frame 40. This ensures the self-standing running practice of the bicycle with the stance of simulating the slopes.

In the embodiment, the front wheel roller adjusters 14 and 16 correspond to the front wheel roller adjusting unit of the invention 3 or 4. The lower plate 16a and the L-shaped top plate 16b correspond to the front wheel roller support unit of the invention 4. The elastic member 16c corresponds to the front wheel side biasing unit of the invention 4. The rear wheel roller adjusters 24 and 26 correspond to the rear wheel roller adjusting unit of the invention 5 or 6. The coupling rod 26a and the parallel slide mechanism 26b correspond to the rear wheel roller support unit of the invention 6. The coupling frames 50 and 52 correspond to the coupling unit of the invention 7. The pulleys 60 to 64 and the belt 66 correspond to the rotation synchronizing unit of the invention 1.

[Modification]

The above-described embodiment configures the front wheel roller adjusters 14 and 16 and the rear wheel roller adjusters 24 and 26 as illustrated in FIG. 8 and FIG. 9. However, the configuration is not limited to this, and the following configuration can be employed. Since the front wheel roller adjuster 14 and the rear wheel roller adjuster 24 are configured similar to the front wheel roller adjuster 16 and the rear wheel roller adjuster 26, the following omits the explanation.

FIG. 11(a) to FIG. 12 are drawings illustrating modifications of the front wheel roller adjuster 16 and the rear wheel roller adjuster 26.

Figure 1:
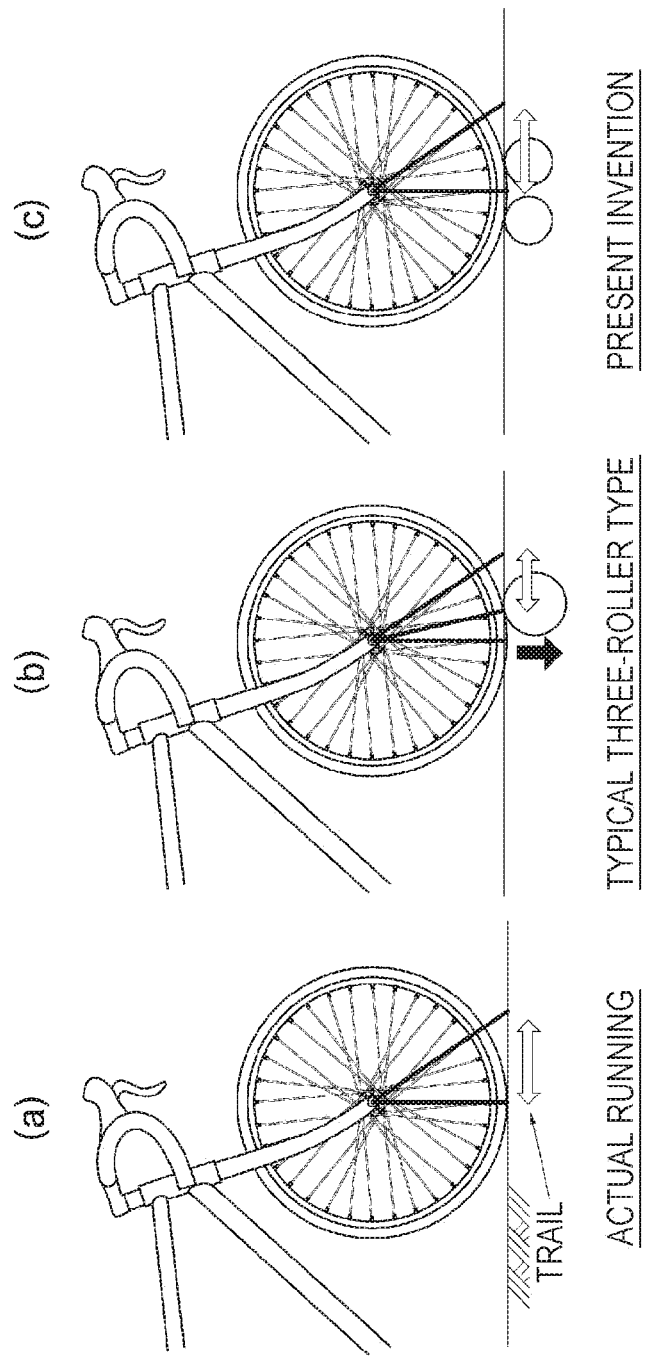
FIGS. 1(a) to 1(c) are drawings to describe a difference in trail in a three-roller bicycle trainer from actual running.
Figure 2:
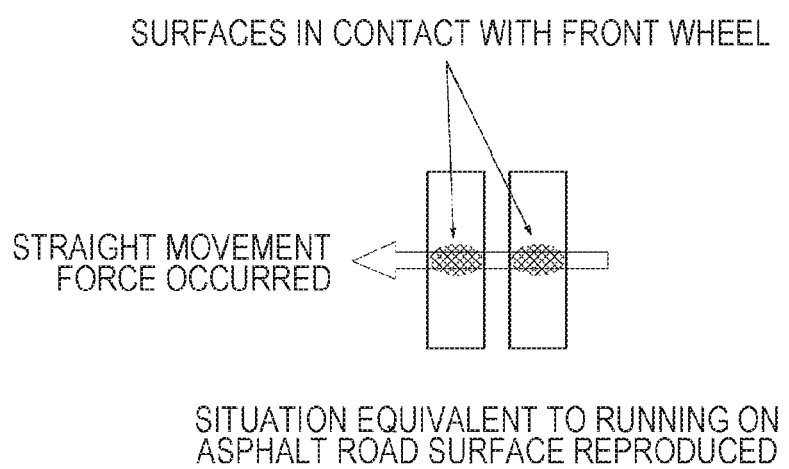
FIG. 2 is a drawing illustrating a state of contacting a front wheel of a bicycle with front wheel rollers.
Figure 5:
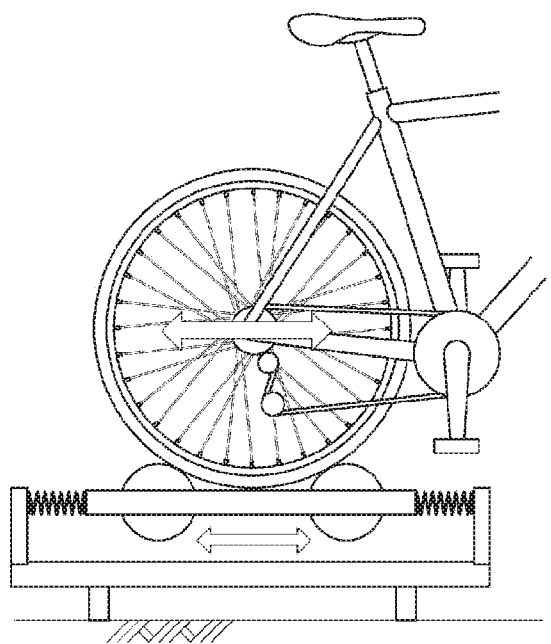
FIG. 5 is a drawing illustrating a configuration of moving rear wheel rollers according to a driving power or a fictitious force of the bicycle.
Figure 6:
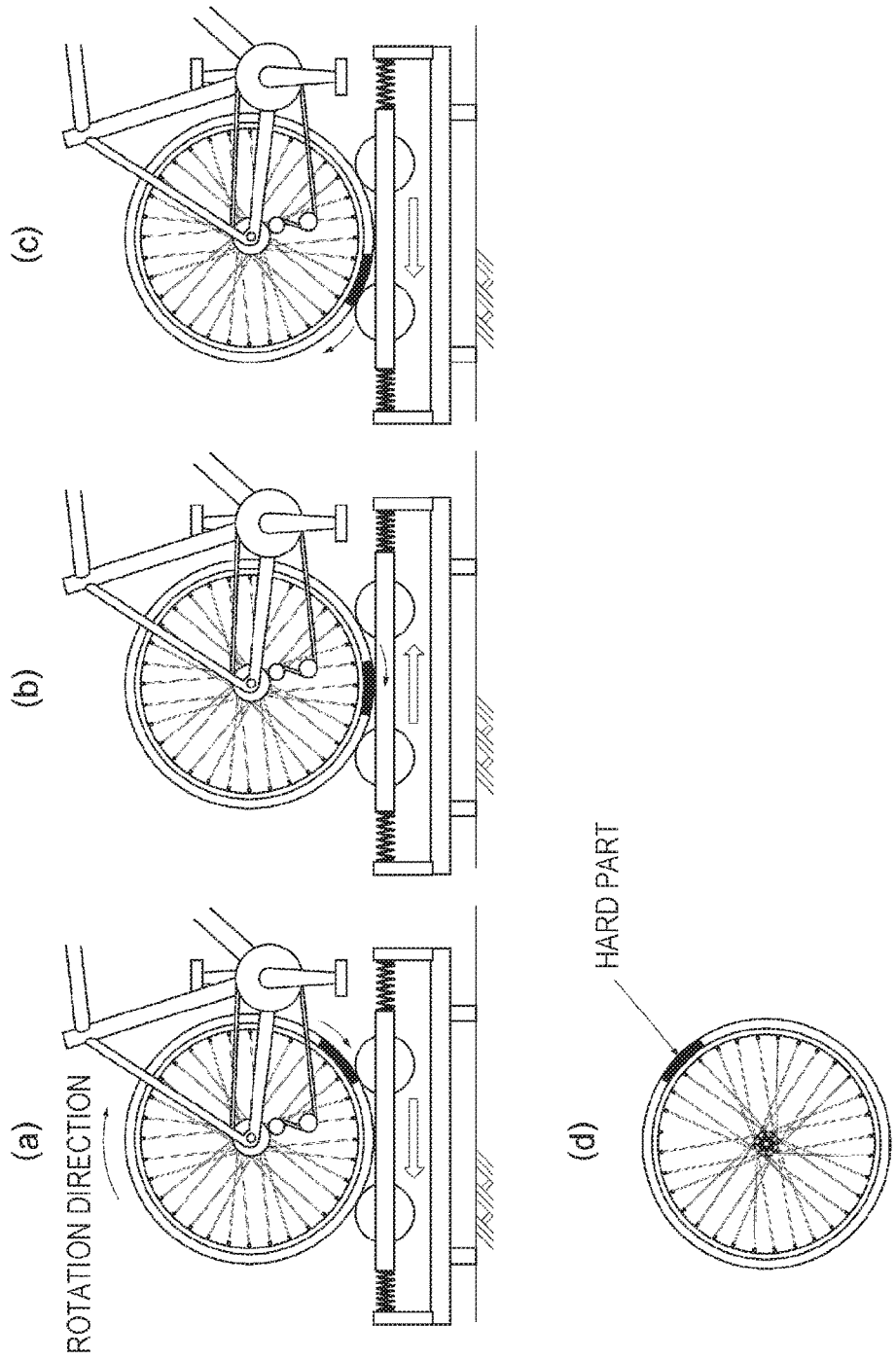
FIGS. 6(a) to 6(d) are drawings to describe a prevention of vibrations and noises by moving the rear wheel rollers.

As a first configuration, as illustrated in FIG. 1 (a), the front wheel roller adjuster 16 includes a link plate 16d, a coupling plate 16e, an elastic member 16f such as a spring, and an elastic member 16g such as a spring. The link plate 16d is secured to a side surface of the right frame 34 and vertically extends upward from the right frame 34. The coupling plate 16e couples a shaft of the front wheel roller 10 with a shaft of the front wheel roller 12 together. A center of the coupling plate 16e is rotatably coupled to an upper end of the link plate 16d. The elastic member 16f is disposed between a front end of the coupling plate 16e and a top surface of the right frame 34. The elastic member 16g is disposed between a rear end of the coupling plate 16e and the top surface of the right frame 34.

An application of a forward load to the front wheel rollers 10 and 12 deforms the elastic members 16f and 16g and inclines the front wheel rollers 10 and 12 forward. Afterwards, when the forward load decreases, the biasing force by the elastic members 16f and 16g returns the front wheel rollers 10 and 12 to the reference postures. Conversely, an application of a rearward load to the front wheel rollers 10 and 12 deforms the elastic members 16f and 16g and inclines the front wheel rollers 10 and 12 rearward. Afterwards, when the rearward load decreases, the biasing force by the elastic members 16f and 16g returns the front wheel rollers 10 and 12 to the reference postures.

As a second configuration, as illustrated in FIG. 11(b), the front wheel roller adjuster 16 includes a lock plate 16h, a lock plate 16i, a coupling plate 16j, a parallel slide mechanism 16k such as a linear guide, an elastic member 16l such as a spring, and an elastic member 16m such as a spring. The lock plate 16h is secured to a top surface of the right frame 34 and is disposed forward of the front wheel roller 10. The lock plate 16i is secured to the top surface of the right frame 34 and is disposed rearward of the front wheel roller 12. The coupling plate 16j couples the shaft of the front wheel roller 10 and the shaft of the front wheel roller 12 together. The parallel slide mechanism 16k is secured to the top surface of the right frame 34 and movably supports the coupling plate 16j in the front-rear direction. The elastic member 16l is disposed between a front end of the coupling plate 16j and the lock plate 16h. The elastic member 16m is disposed between a rear end of the coupling plate 16j and the lock plate 16i.

An application of a forward load to the front wheel rollers 10 and 12 moves the front wheel rollers 10 and 12 forward according to the load. Afterwards, when the forward load decreases, the biasing force by the elastic members 16l and 16m returns the front wheel rollers 10 and 12 to the reference positions. Conversely, an application of a rearward load to the front wheel rollers 10 and 12 moves the front wheel rollers 10 and 12 rearward according to the load. Afterwards, when the rearward load decreases, the biasing force by the elastic members 16l and 16m returns the front wheel rollers 10 and 12 to the reference positions.

As a third configuration, as illustrated in FIG. 11(c), the rear wheel roller adjuster 26 includes a U-shaped sub-frame 26c, link plates 26d and 26e, a coupling frame 26f, an elastic member 26g such as a spring, and an elastic member 26h such as a spring. The U-shaped sub-frame 26c is secured to a top surface of the right frame 44. The link plates 26d and 26e are secured to a side surface of the sub-frame 26c and vertically extend from the sub-frame 26c downward. The coupling frame 26f couples a shaft of the rear wheel roller 20 and a shaft of the rear wheel roller 22 together. A front end and a rear end of the coupling frame 26f are rotatably coupled to lower ends of the link plates 26d and 26e, respectively. The elastic member 26g is disposed between the front end of the coupling frame 26f and the sub-frame 26c. The elastic member 26h is disposed between a rear end of the coupling frame 26f and the sub-frame 26c.

An application of a forward load to the rear wheel rollers 20 and 22 moves the rear wheel rollers 20 and 22 forward according to the load. Afterwards, when the forward load decreases, the biasing force by the elastic members 26g and 26h returns the rear wheel rollers 20 and 22 to the reference positions. Conversely, an application of a rearward load to the rear wheel rollers 20 and 22 moves the rear wheel rollers 20 and 22 rearward according to the load. Afterwards, when the rearward load decreases, the biasing force by the elastic members 26g and 26h returns the rear wheel rollers 20 and 22 to the reference positions.

Instead of the front wheel roller adjuster 16 and the rear wheel roller adjuster 26, as illustrated in FIG. 12, a fourth configuration includes a coupling frame 50a, a link plate 50b, a coupling plate 50c, an elastic member 50d such as a spring, an elastic member 50e such as a spring, a base frame 50f, a lock plate 50g, a lock plate 50h, parallel slide mechanisms 50i and 50j such as a linear guide, an elastic member 50k such as a spring, and an elastic member 50l such as a spring. The coupling frame 50a couples the shaft of the rear wheel roller 20 and the shaft of the rear wheel roller 22 together. The link plate 50b is secured to a side surface of the coupling frame 50a and vertically extends from the coupling frame 50a upward. The coupling plate 50c couples the shaft of the front wheel roller 10 and the shaft of the front wheel roller 12 together. A center of the coupling plate 50c is rotatably coupled to an upper end of the link plate 50b. The elastic member 50d is disposed between a front end of the coupling plate 50c and a top surface of the coupling frame 50a. The elastic member 50e is disposed between a rear end of the coupling plate 50c and the top surface of the coupling frame 50a. The lock plate 50g is secured to the top surface of the base frame 50f and is disposed forward with respect to the front wheel roller 10. The lock plate 50h is secured to a top surface of the base frame 50f and is disposed rearward with respect to the front wheel roller 12. The parallel slide mechanisms 50i and 50j are secured to the top surface of the base frame 50f and movably support the coupling frame 50a in the front-rear direction. The elastic member 50k is disposed between a front end of the coupling frame 50a and the lock plate 50g. The elastic member 50l is disposed between a rear end of the coupling frame 50a and the lock plate 50h.

An application of a forward load to the front wheel rollers 10 and 12 deforms the elastic members 50d and 50e and inclines the front wheel rollers 10 and 12 forward. Afterwards, when the forward load decreases, the biasing force by the elastic members 50d and 50e returns the front wheel rollers 10 and 12 to the reference postures. Conversely, an application of a rearward load to the front wheel rollers 10 and 12 deforms the elastic members 50d and 50e and inclines the front wheel rollers 10 and 12 rearward. Afterwards, when the rearward load decreases, the biasing force by the elastic members 50d and 50e returns the front wheel rollers 10 and 12 to the reference postures.

An application of a forward load to the rear wheel rollers 20 and 22 moves the rear wheel rollers 20 and 22 forward according to the load. Afterwards, when the forward load decreases, the biasing force by the elastic members 50k and 50l returns the rear wheel rollers 20 and 22 to the reference positions. Conversely, an application of a rearward load to the rear wheel rollers 20 and 22 moves the rear wheel rollers 20 and 22 rearward according to the load. Afterwards, when the rearward load decreases, the biasing force by the elastic members 50k and 50l returns the rear wheel rollers 20 and 22 to the reference positions.

The above-described embodiment and the modifications are configured to adjust the positions of the rear wheel rollers 20 and 22 by the rear wheel roller adjusters 24 and 26. However, this should not be constructed in a limiting sense. Like the front wheel roller adjusters 14 and 16, the rear wheel roller adjusters 24 and 26 can also be configured to adjust the postures of the rear wheel rollers 20 and 22.

DESCRIPTION OF REFERENCE SIGNS

100: Bicycle trainer
10, 12: Front wheel roller
14, 16: Front wheel roller adjuster
16a: Lower plate
16b: L-shaped top plate
16c, 16f, 16g, 16l, 16m, 26g, 26h, 50d, 50e, 50k, 50l: Elastic member
16d, 26d, 26e, 50b: Link plate
16e, 16j, 50c: Coupling plate
16h, 16i, 50g, 50h: Lock plate
16k, 26b, 50i, 50j: Parallel slide mechanism
20, 22: Rear wheel roller
24, 26: Rear wheel roller adjuster
26a: Coupling rod
26c: Sub-frame
26f, 50a, 50, 52: Coupling frame
30: Front wheel frame
32: Left frame
34: Right frame
34a: Groove
36: Front frame
40: Rear wheel frame
42: Left frame
44: Right frame
46: Rear frame
50f: Base frame
60 to 64: Pulley
66: Belt
70: Base

The invention claimed is:

1. A bicycle trainer comprising:
   a pair of front wheel rollers that supports a front wheel of a bicycle;
   a pair of rear wheel rollers that supports a rear wheel of the bicycle;
   a rotation synchronizing unit configured to synchronize a rotation of the front wheel rollers with a rotation of the rear wheel rollers;
   a front wheel roller adjusting unit configured to follow a handlebar operation of the bicycle to adjust positions of the front wheel rollers; and
   a rear wheel roller adjusting unit configured to adjust positions of the rear wheel rollers depending on a driving power generated from running the bicycle,
   wherein contact positions where the front wheel of the bicycle contacts the front wheel rollers are maintained to be constant by adjusting the positions of the front wheel rollers by the front wheel roller adjusting unit.

2. The bicycle trainer according to claim 1, wherein each of the front wheel rollers is separated from each other such that a trail of the front wheel of the bicycle on the front wheel rollers simulates a wheel moving on a road surface.

3. A bicycle trainer comprising:
   a pair of front wheel rollers that supports a front wheel of a bicycle;
   a pair of rear wheel rollers that supports a rear wheel of the bicycle;
   a rotation synchronizing unit configured to synchronize a rotation of the front wheel rollers with a rotation of the rear wheel rollers; and
   a front wheel roller adjusting unit configured to follow a handlebar operation of the bicycle to adjust positions of the front wheel rollers such that contact positions where the front wheel of the bicycle contacts the front wheel rollers become constant, wherein
   the front wheel roller adjusting unit includes:
      a front wheel roller support unit that movably supports the front wheel rollers; and
      a front wheel side biasing unit that biases the front wheel roller support unit, and
   the positions of the front wheel rollers change depending on a load to the front wheel rollers and the positions of the front wheel rollers are returned to reference positions by a biasing force of the front wheel side biasing unit.

4. A bicycle trainer comprising:
   a pair of front wheel rollers that supports a front wheel of a bicycle;
   a pair of rear wheel rollers that supports a rear wheel of the bicycle;
   a rotation synchronizing unit configured to synchronize a rotation of the front wheel rollers with a rotation of the rear wheel rollers;
   a front wheel roller adjusting unit configured to follow a handlebar operation of the bicycle to adjust positions of the front wheel rollers such that contact positions where the front wheel of the bicycle contacts the front wheel rollers become constant; and
   a rear wheel roller adjusting unit configured to adjust positions of the rear wheel rollers depending on a driving power generated from running the bicycle, wherein
   the rear wheel roller adjusting unit includes:
      a rear wheel roller support unit that movably supports the rear wheel rollers; and
      a rear wheel side biasing unit that biases the rear wheel roller support unit, and
   the positions of the rear wheel rollers change depending on a load to the rear wheel rollers and the positions of the rear wheel rollers are returned to reference positions by a biasing force of the rear wheel side biasing unit.

5. The bicycle trainer according to claim 1, comprising:
   a front wheel frame to install the front wheel rollers;
   a rear wheel frame to install the rear wheel rollers; and
   a coupling unit that couples the front wheel frame and the rear wheel frame together such that a height of the front wheel frame with respect to the rear wheel frame is adjustable.

* * * * *